United States Patent [19]
Othmer

[11] 3,859,077
[45] Jan. 7, 1975

[54] MANUFACTURE OF TITANIUM CHLORIDE, SYNTHETIC RUTILE AND METALLIC IRON FROM TITANIFEROUS MATERIALS CONTAINING IRON

[76] Inventor: Donald F. Othmer, 333 Jay St., Brooklyn, N.Y. 11201

[22] Filed: Apr. 20, 1973

[21] Appl. No.: 352,947

Related U.S. Application Data
[63] Continuation-in-part of Ser. No. 235,531, March 17, 1972, abandoned.

[52] U.S. Cl. ............................ 75/1, 75/34, 423/75, 423/149
[51] Int. Cl. ........................ C21b 1/00, C22b 53/00
[58] Field of Search ............ 423/492, 493, 83, 612, 423/75, 76; 75/1 T, 26, 34, 28, 84

[56] References Cited
UNITED STATES PATENTS

| | | | |
|---|---|---|---|
| 1,845,342 | 2/1932 | Saklatwalla | 423/75 |
| 2,183,365 | 12/1939 | Booge | 423/75 |
| 2,184,887 | 12/1939 | Muskat | 423/75 |
| 2,245,077 | 6/1941 | Muskat | 423/75 |
| 2,527,257 | 10/1950 | Judd | 75/1 T |
| 2,933,373 | 4/1960 | Love | 75/1 T |
| 3,244,509 | 4/1966 | Nowak | 423/149 |
| 3,423,178 | 1/1969 | Wilcox | 75/1 T |
| 3,472,648 | 10/1969 | Suriani | 75/1 T |

*Primary Examiner*—L. DeWayne Rutledge
*Assistant Examiner*—Peter D. Rosenberg

[57] ABSTRACT

Substantially pure titanium dioxide is made under reducing conditions by a halogen-oxygen interchange between a titanium tetrahalide and an oxide of iron contained in a slag, or an ore such as ilmenite, at a temperature, approximately 1000°C. The iron and some impurities such as phosphorus, sulfur, vanadium, and chromium are volatilized as halides or oxyhalides. Solid titanium dioxide remains with some impurities which may be washed out with water or an aqueous acid or alkali. The gaseous ferrous halide is then reacted with some or all of the titanium dioxide and a reductant at a temperature above about 1550°C so as to be reduced to molten metallic iron and to give the gaseous titanium halide which is passed to the first reactor. Only makeup halogen is required.

28 Claims, 1 Drawing Figure

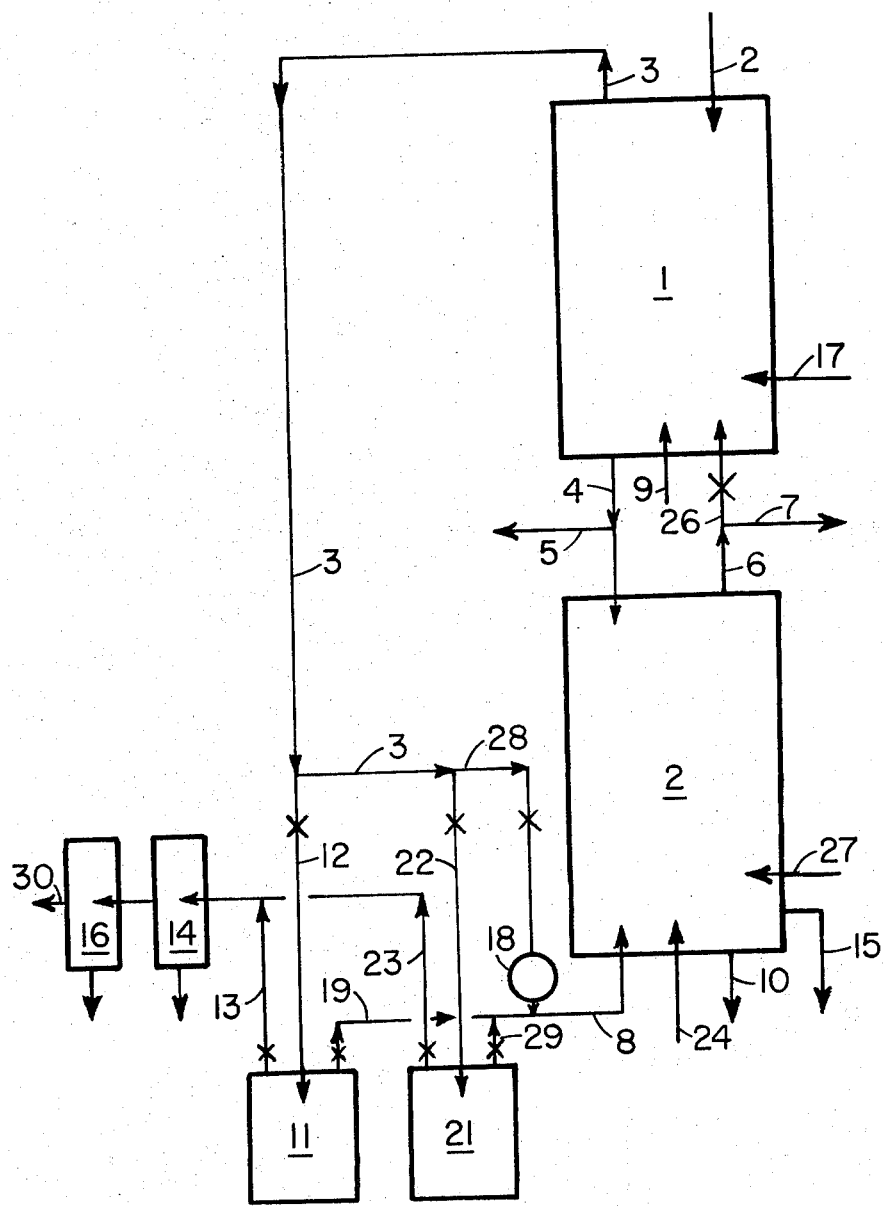

MANUFACTURE OF TITANIUM CHLORIDE, SYNTHETIC RUTILE AND METALLIC IRON FROM TITANIFEROUS MATERIALS CONTAINING IRON

This application is a continuation-in-part of copending Ser. No. 235,531, filed Mar. 17, 1972, and now abandoned.

Dried and pulverant coke and ilmenite, or comparable iron-titanium slags, are fed to a first reactor at a temperature between about 950° and 1050°C and are reacted with the titanium halide gas discharged from a second reactor maintained at a temperature above 1100°C and preferably above 1550°C. Titanium oxide formed in the first reactor passes from it to the second reactor and may be obtained as a product from the discharged solids of one or the other or both. The reaction of the titanium halide gas with the iron oxide of the ilmenite in the first reactor gives a volatile iron halide which passes from the top of the first reactor and thence to the bottom of the second, higher temperature, reactor to be reduced by coke to metallic iron, preferably above the melting point, so it discharges in molten form, while the gaseous titanium halide is also produced and passed to the first reactor. The molten iron is drawn off for casting as pigs and is thus separated in a nearly pure form, while a synthetic rutile, of at least 95% $TiO_2$ is also obtained; and various other elements present as impurities in the original ore are also separated in marketable form.

Thus $TiO_2$ in a relatively pure form is produced from titaniferous iron ores, the most important of which is ilmenite, $FeO.TiO_2$; also from titanium containing hematitic ores; also from ores containing titanium and oxygen in compounds with other elements as silicon, calcium, etc, also from blast furnace or other slags from iron smelting operations; and also from other mixed ferrous and titaniferous materials containing the impurities normally associated therewith. All materials are produced in a closed system in marketable form, with little if any loss of potential metal values and no pollutive wastes. Only a small amount of halogen is required for this cyclic operation which removes iron from the ore or slag first as the halide, then discharges it as nearly pure metallic iron.

Most pigment grade $TiO_2$ has been made to date by reacting ilmenite with sulfuric acid, separating the iron as sulfate and working up the solution for $TiO_2$. Large amounts of ferrous sulfate and sulfuric acid have always been discharged as waste; often this is a nuisance.

Chlorination of rutile ore, usually above 90% $TiO_2$, gives $TiCl_4$. This is the starting point for titanium metal processes. And the burning of the $TiCl_4$ with oxygen gives $TiO_2$ representing an ever increasing amount of the pigment produced. Iron which is present gives an iron chloride which often is a waste, along with other non-volatile chlorides and oxides. There is not as much waste as in the sulfate process for $TiO_2$; but pollution is still a major problem.

The mineral rutile, $TiO_2$, appears in very much smaller amounts and in many fewer places in the earth's crust than does the mixed oxides of titanium and iron, ilmenite $FeO.TiO_2$. Rutile ore contains, per ton, usually about twice as much titania as does ilmenite ore; but it may have a market value based on the titania content of from 3 to 7 times as much. While ilmenite is often mentioned hereinafter, other materials, particularly those titaniferous ores or residues containing iron, may be processed similarly. Much chemical processing of ilmenite, including all of that discussed hereinafter may take place on the individual metal oxides as if they were merely in physical mixture; and reactions and their chemical equations may be considered as if the two oxides were not combined.

Known beneficiation processes produce rutile by the removal of the iron oxide from ilmenite at a lower processing cost than the large difference of the selling prices of the two minerals. Usually these processes discharge the iron as a chloride, either gas or solid, or as an aqueous solution. All of them present major problems of waste disposal. Thus a method for removing the iron in a non-polluting form is needed.

Chlorine is much the most available and inexpensive halogen to use in any halogenating process, thereby producing volatile metallic chlorides; also hydrogen chloride from any hydrogen present in moisture, in the coke, or in other reductant. Bromine and sometimes fluorine or even iodine also may be used, although each has obvious disadvantages, sometimes advantages. Since the other halogens and their halides may be used as halogenation agents, it is understood that they are included in the description of the several aspects of the invention, although only the chlorination steps and the chlorides are usually mentioned.

CHEMISTRY OF THE PROCESS

It is known that the oxides of both the iron and titanium in ilmenite can be reacted with chlorine gas in a reduction-chlorination — i.e., in the presence of coke; and in the absence of coke, the iron may be preferentially chlorinated. Also, it has been shown in the copending application U.S. Ser. No. 235,531, that in an oxidation-chlorination, without a reductant being present, the iron oxide may be chlorinated by $TiCl_4$ to $FeCl_3$, while interchanging its oxygen to form $TiO_2$.

Now it has been found that in the presence of a solid reductant, as coke, and at a temperature from 600°C or thereabouts and up to about 1000°C to 1050°C, the $TiCl_4$ will chlorinate the iron in ilmenite to ferrous chloride according to the following reaction in what may be called a first reactor:

$$TiCl_4 + 2 FeO \rightarrow 2 FeCl_2 + TiO_2 \qquad (1)$$

Contrary to the previous art, the presence of coke has been found to be quite desirable, while previously it was excluded for undesired effects which will be evident later. Coke has now been found to give preferred results at a temperature below about 1050°C to 1100°C. Also if coke is present it burns with added oxygen or air to give heat for bringing the reactants up to the desired optimum temperature for the reaction, just below 1050°C. Moreover coke is much more easily added to the ore solids before they go to the first reactor, rather than before going to a second reactor where they enter into the reaction as explained hereinafter. The charging of the ore and reductant together to the first reactor is thus a major advantage, not hitherto thought possible.

The $FeCl_2$ formed melts at 670°C and boils at 1015°C. This boiling point is lowered by the partial pressures of other vapors and gases in this gas stream; and substantially all of the $FeCl_2$ formed is vaporized below 1000°C or even at 950°C particularly in a counter current reactor of three stages.

Furthermore, the carbon reductant, usually coke, reduces in the first reactor any ferric iron present, e.g., as $Fe_2O_3$, to the ferrous form herein desired while reacting according to the following equation:

$$TiCl_4 + Fe_2O_3 + C \rightarrow 2FeCl_2 + TiO_2 + CO \quad (1a)$$

At any temperature above about 1100°C and preferably above 1535°C, the melting point of iron, another and second principal reaction has now been found to proceed and is accomplished in a second reactor. This reaction is somewhat the reverse of those of Equations 1 and 1a in that it uses the $FeCl_2$ which has formed in the first reactor; this $FeCl_2$ is now added back to the mixture of ore solids from the previous reaction and the coke still present. The $FeCl_2$ is now the chlorinating agent for a reaction in the second reactor with the titanium oxide present in the original ore or slag, or formed in the reactions of Equations 1 and 1a $$2FeCl_2 + TiO_2 + 2C \rightarrow TiCl_4 + 2Fe + 2CO \quad (2)$$

In all of these reactions, the two constituent oxides of ilmenite, FeO and $TiO_2$, may be regarded as practically independent compounds, since the free energy of formation of ilmenite from the two oxides is small compared with that of formation of either oxide.

By the use of this new-found reaction, the iron, after first being chlorinated in a first reactor, is separated in metallic form in the second reactor, thus it has been separated from the $TiO_2$ of the ilmenite by the reactions of Equations 1 and 1a at 950° to about 1050°C to appear in vaporous form as $FeCl_2$. This $FeCl_2$ is passed to the substantially iron-free solid products of the first reaction, largely $TiO_2$. Now by heating together to above 1100°C, the residual $TiO_2$ and the $FeCl_2$, both coming from the first reactor as well as the coke which remains in the mixture of solids made up before the original feed, there is formed metallic iron and vaporous $TiCl_4$ which passes off in a gas stream with the CO also formed. Furthermore, if the reaction of Equation 2 is operated in the second reactor at a temperature above the melting point of iron, 1535°C, the iron so produced, separates as liquid, metallic iron from the $TiO_2$ which, at this high temperature, is in the rutile, rather than the anatase, form.

If an amount of titanium equivalent to that in the feedstock is removed as $TiO_2$ after the reaction of Equation 1, while some amount — say equivalent to that formed in the reaction as $TiO_2$ and then converted to $TiCl_4$ in the reaction of Equation 2—is recycled as $TiCl_4$ to the reaction of Equation 1; and if the iron in the feedstock is removed as melted metal, no chlorine is used in this cycle of separation of the iron from the titanium in their respective compounds. However chlorine must be supplied for that used in forming the chlorides or oxychlorides of other metals than iron and titanium. These pass off, if volatile, from the first reactor as the reaction products of the impurities present in the original ore, e.g. gaseous chlorides or oxychlorides of P,V,Cr, etc., which leave with the $FeCl_2$ after the reaction of Equation 1, or if non-volatile they remain as solids, which are always water soluble, chlorides of Ca, Na, Mg, etc. These non-volatile chlorides remain in the $TiO_2$ product, and may be removed and separated as explained in the copending application U.S. Ser. No. 235,531.

Some makeup chlorine for these side reactions and any small loss, is therefore required; and it should be added to the second reactor where the temperature is relatively high. If added at a point of low temperature of the second reactor—or in the first, low temperature, reactor—the reaction of the following equation has been found to take place at temperatures above about 600°C.

$$FeO + TiO_2 + 2Cl_2 + 3C \rightarrow TiCl_4 + Fe + 3CO \quad (3)$$

This formation of metallic iron is highly undesirable in the first reactor, if product $TiO_2$ is to be removed therefrom, as it would be contaminated with metallic iron. The same would be true if product $TiO_2$ is removed from the second or high temperature reactor wherein Equation 2 pertains; and chlorine is added at a point where the temperature is too low, i.e., below the melting point of iron.

However, if product $TiO_2$ is not to be withdrawn from the first reactor, some metallic iron from the reaction of Equation 3, or coming from other reactions, is not objectionable discharging with the solids from the bottom of the first reactor.

In some cases, the reaction of Equation 3 may be used to give the iron; but it has to compete with the direct chlorination of FeO, also to give $FeCl_2$ which goes off with $TiCl_4$. Furthermore Equation 3 uses only virgin chlorine, while Equation 2 uses recycled $FeCl_2$. A reactor with at least several counter current equilibrium stages for thorough contacting of gas and solids is desirable.

EQUIPMENT USED

Either batch or continuous processing may be used to attack the ores and then produce therefrom the purified $TiO_2$ and iron metal, or $TiCl_4$ and iron metal. The ore is first milled to a fine particulate or pulverant form, which is then thoroughly dried and calcined to minimize the presence of free or confined water, which, if retained, reacts with chlorine and metal chlorides to give hydrogen chloride. This is a waste of chlorine — and a hazard to equipment because of its corrosiveness.

The chemical processing may be done in any one of the many batch, cyclic, and continuous types of reactors, furnaces, roasters, and related types of equipment used for such chlorinations, and constructed of various known materials proof against the corrosive conditions which pertain. The design of the equipment is not part of the present invention; however, it has been found desirable that the reactors, in the continuous processing involved should maintain as nearly as possible a countercurrent flow of gases and solids. Desirably, to insure the maximum efficiency of the reactions, the reactors should each have more than one equilibrium unit of contacting, and desirably three such units.

ACCOMPLISHMENTS OF THE PROCESS

In the previous art, involved and expensive processes comprising many steps have been utilized to upgrade ilmenite to a so-called synthetic rutile, even at considerable costs for heat, chemicals, equipment and processing. Usually the disposal of iron chloride, also produced in the form of solid or gas, or of a liquid solution presents some difficulties. Since rutile ore is often mined and mechanically concentrated to about 95% $TiO_2$, the object has usually been to make a product in that range of purity. The presently described process thus has as its object, and does accomplish:

a. the increment of the titania content of an iron-containing titaniferous ore, or of a slag resulting from the processing of ores containing titania;

b. the beneficiation to a rutile grade of ilmenite, ilmenite-hematite, or titaniferous slag without dissolution of either iron or of titanium;

c. the removal of colored compounds such as those of chromium while beneficiating a titaniferous ore;

d. the production of titania-white via $TiCl_4$ without burning the $TiCl_4$ with air or oxygen;

e. the production of titania-white in a continuous chlorination procedure in the presence of a reductant;

f. the attainment of most or all of the above objects simultaneously, while removing, as substantially pure metal, the iron present in the ore or slag, in a single heating of the ore or other solids.

Other objects and accomplishments, and means for their attainment appear below.

FIGURE

The FIGURE is entirely digramatic and it has no relation to dimensions, scales, or even shapes of actual operating equipment. It is essentially a flow sheet of the process of the invention to illustrate some of its various steps, wherein any suitable and known pieces of equipment may be used. Not shown are the accessory systems for heating, nor the instruments for the measurement of the temperatures of different parts of the operations, nor the valves, instruments, or items of equipment for supply or feed of solids and gases, or for measuring their amounts, rates of feed and temperatures. Nor are there indications in the figure of the amounts of feeds or passage of materials from one vessel or zone to another, which flows are indicative generally of a continuous operation of all such flows simultaneously. Indeed, these passages of materials through these lines may be at different or intermittent times, particularly if the operation is of the discontinuous or batch type.

The FIGURE is the flow sheet of the chlorination of a titaniferous material which contains iron, conducted in one of several ways so that the iron may be removed as the molten metal; and the titanium may be removed either (a) as a gaseous stream of $TiCl_4$; (b) in a gaseous stream of $TiCl_4$ with more or less iron chloride; or (c) as solid titania of much greater $TiO_2$ content than the original ore. Meanwhile, the impurities associated with the natural ore, as metals, oxides, or complex salts, or with their chlorination products, are also removable as described below. For convenience in operation, the flow sheet shows the second or high temperature reactor, located beneath the first or low temperature reactor; and this arrangement may be a convenience to allow gravity flow of solids into the first reactor, thence to the second, thence to a point of discharge therefrom. The reverse arrangement of the second above the first, or a horizontal arrangement of both reactors may be preferable in other cases without departing from the practice of the invention.

The Separation Process

In the figure, a reactor, 1, arranged for a countercurrent solids-gas flow, is desirably of a countercurrent efficiency of from one to three equilibrium units. It is maintained at a temperature of from about 950°C to about 1050°C. A mixture of prepulverized and predried ilmenite and coke is fed in at the top by a feed arrangement through line 2, and descends against a rising and uniformly distributed gas stream containing $TiCl_4$ entering from lines 26 and 6. Any ferric iron present is reduced by the reaction of Equation 1a; and simultaneously the oxygen-chlorine interchange of the metals, as indicated in Equation 1, takes place.

The iron-titanium oxide of ilmenite is a chemical compound; but it reacts, for practical purposes, as if it were a physical mixture of the two individual oxides. The $FeCl_2$ formed has a boiling point of about 1015°C, thus it is desired to keep all points of the reactor above this temperature. However, $FeCl_2$ has been found to be carried over as a somewhat lower temperature than its normal boiling point, down to 950°C or lower, by the partial pressures of the other vapors and the permanent gases present in the gas stream. The gas stream containing the $FeCl_2$ also carries off at 3 the P, Cr and V, originally present in the ore, as their low boiling chlorides or oxychlorides which have been formed in the reactor; and any sulfur which may have been in the coke also goes off in the gas as $SO_2$ or $SCl_2$. There will also be in the stream in 3, CO, possibly some $CO_2$, also $N_2$ if air instead of $O_2$ is supplied at 9 to burn with coke to bring the reactants up to and/or maintain them at the desired temperature. Chlorine may be added at 17, particularly at the start-up to chlorinate the iron preferentially; but usually both $Cl_2$ and $O_2$ are not added at the same time.

The iron oxide is stripped in 1 by the countercurrent contacting and chemical reaction of $TiCl_4$ with the mixture of the solids, ilmenite and coke. A solid residue remains. This is largely $TiO_2$, which discharges from 4. Some of this residue may be discharged at 5 to be worked up further for the removal of minor impurities in the $TiO_2$ as described in co-pending U.S. Ser. No. 235,531.

The mixed gas stream in 3, containing $FeCl_2$, is passed through one of the alternate valved lines 12 or 22 to condense in one of the two alternate condenser-receiver-boilers 11 or 21. This is maintained at a temperature of about 250°C–300°C so that, if any $FeCl_3$ is inadvertently present, it also is condensed out fractionally. Gases which are present but do not condense at this temperature are other chlorides (including any small amount of $TiCl_4$) or oxychlorides, also HCl, $SO_2$, and permanent gases. These pass from the fractional condensers 11 or 21, through one of the valved lines 13 or 23, to a water-cooled condenser 14, the discharge of which, containing chlorides and oxychlorides, is worked up by known methods for these several values. The scrubber 16 removes $SO_2$ and HCl for subsequent separation as well as other water-soluble, non-condensibles. The permanent gases discharge at vent 30.

Condenser-receivers for $FeCl_2$, 11 and 21, are used alternately; i.e., when 11 is charged with condensed iron chlorides, it is taken out of condenser duty, as 21 is put on stream. Then the contents of 11 are heated to pass a vapor stream, largely $FeCl_2$, through valved line 19 and then line 8 to reactor 2, which is maintained at a temperature of 1100°C to 1600°C, or somewhat higher. The valves on the lines 12, 22, 13, 23, 19 and 29, allow the alternation in service of the identical condenser-receiver-boilers 11 and 21.

The reaction in 2, indicated by Equation 2, chlorinates $TiO_2$ by $FeCl_2$ to give $TiCl_4$, which passes to reactor 1. Meanwhile this transfer of chlorine and the action of the coke takes place to reduce the $FeCl_2$ and give molten iron, which is tapped off at the bottom, 10, as in an iron blast furnace.

If more $TiO_2$ enters 2 from line 4 than the stoichiometric equivalent of the $FeCl_2$ entering at 8 (equivalent to the $TiCl_4$ leaving at line 6) then this excess $TiO_2$ will be withdrawn at 15, usually in a form from which 45 to 99% $TiO_2$ may be separated. If less $TiO_2$ enters by 4 than the equivalent $FeCl_2$ which enters by 8, some $FeCl_2$, $FeCl_3$ or equivalent $Cl_2$ may pass off at 6 with $TiCl_4$.

Also, $TiCl_4$ may be withdrawn through line 7 as a product by proper balancing of the amounts of materials passing in the several flows. However, this represents a withdrawal of chlorine from the system, as does also the removal of metal chlorides, oxychlorides, and HCl from 14 and 16. These removals may be balanced continuously by an input of chlorine gas through 27 at a point in reactor 2 where the temperature is sufficiently above the melting point of iron so that any iron formed is discharged in the molten form.

Oxygen, as such or as air, may be added at 24 to combust the coke which is present and thus give heat to bring reactor 2 and its reactants up to, and be maintained at, the desired temperature above 1535°C, the melting point of iron. Usually the optimum temperature is 1600°C–1800°C.

Whether the titanium in the original feedstock is taken off as $TiO_2$ at 5, or as $TiCl_4$ at 7, the low temperature reactor, 1, must be operated so as to strip all iron out of the stream leaving at 4. Thus, no FeO can discharge with $TiO_2$ at 5 or no Fe entering 2 from 4 can become again $FeCl_2$ and go out with $TiCl_4$ at 7. Hence, reactor, 1, should have an efficient countercurrent action.

The $FeCl_2$ containing possibly a very small amount of $FeCl_3$ which enters 2 via line 8 is a substantially pure, distilled material, from which has been separated the S, P, Cr, and V (as well as some other possible impurities) which may be in the ore or in the coke. This purification is by means of the fractionation described in U.S. Ser. No. 235,531, which takes advantage of the combination of selective chlorination and selective volatilization or distillation of the chlorides and oxychlorides. The iron which is tapped off at 15 is thus a highly purified iron; and similarly the $TiO_2$ which passes off at 5 is well above 95% and in a form which often allows it to be used without further purification.

The condensation of the $FeCl_2$ in 11 or 21, and its re-evaporation therefrom as described above, serves two principal purposes: (a) it allows the immediate separation therefrom of the other chlorides, oxychlorides, also $SO_2$, CO, $CO_2$, $N_2$, etc. released in the first reactor, 1; thus the substantial purification of the iron as nearly pure $FeCl_2$, as well as the substantial reduction of the gas volume; and (b) the re-evaporation of $FeCl_2$ which allows its introduction into 2 at the somewhat higher pressure desirable or necessary to pass it through 2.

A somewhat simpler operation may be used which usually gives somewhat less pure iron and $TiO_2$, also a somewhat lesser capacity of the reactor, 2, since it must handle a much greater volume of gas.

Instead of condensation of $FeCl_2$ in 11 or 21, and its re-evaporation at a somewhat higher pressure, the gas stream may be shut off from entry into lines 12 or 22 by their respective valves. It then leaves line 3 to be passed uncondensed through line 28; and a gas compressor or blower, 18, increases its pressure so that it may flow directly through reactor, 2. In 2 is accomplished the reaction of Equation 2 to give iron and $TiCl_4$. The gaseous $TiCl_4$ is in the gas stream containing all of the gases except $FeCl_2$, of the stream of line 3, plus additional CO and any other gases developed in reactor, 2. These could not be passed through lines 6 and 26 back to 1, for an indefinite recycling; hence all gases from 2 are discharged from 7; and the valve in line 26 is closed. The $FeCl_2$ in the gas stream has now been replaced almost completely by $TiCl_4$, by the countercurrent reaction in 2.

This gas stream leaving through line 7 is then worked up to separate substantially pure $TiCl_4$: (a) for product if desired, and (b) for recycle back to reactor 1 through a connection for independent feeding in line 26, above the valve, or to line 17, the chlorine inlet. The impurities are readily removed from the $TiCl_4$ largely by fractional condensation: (a) first of the $FeCl_2$ and any trace of $FeCl_3$ by a condenser maintained at, say 250°C–300°C, then (b) by condensation of $TiCl_4$ at its condensing temperature of 136°C. The remaining gas stream, CO, $CO_2$, $N_2$, etc. is exhausted to the atmosphere after scrubbing to remove other lower boiling chlorides, oxychlorides, and other noxious materials. The liquid $TiCl_4$ is produced in as pure a form as desired for product, by rectification if desired. At least part of the $TiCl_4$, either before or after final purification is vaporized and reintroduced by a connection not shown into 1 through lines 26 or 17 for its reaction there to give $FeCl_2$ by the reactions on the raw ore or slag.

In some designs of the reactions, 1 and 2, particularly if they have low back pressures, it is not necessary to use the blower or compressor 18; and reactor, 2, may still be operated, but under a slightly lower pressure than that of 1.(The solids, largely $TiO_2$, flowing down pipe, 4, then have a special trap or feeder to prevent gas flow through 4.) The boiler mentioned above, which would supply vaporous $TiCl_4$ to 1 through connections to line 26 or 17, not shown, simply operates at a pressure equivalent to the back pressure of the combination of 1 plus 2 and also of the necessary condensers and/or other separating devices connected at exit 11 for the passage of the impure gas stream carrying $TiCl_4$.

OPERATION WITH A SINGLE REACTOR

When $TiCl_4$ and metallic iron are the desired products, a single reactor or furnace may be used, preferably in concurrent gas-solid flow. Usually an open shaft type furnace is simplest. It is fed at the top wit a mixture of pre-pulverized and pre-calcined ore or slag and coke, and through another inlet at the top with chlorine. This modification of the process is particularly adapted to titaniferous iron ores or slags wherein the ratio of iron atoms to titanium atmos is two or more to one.

Because of its simplicity, no diagram is necessary since it consists merely of a vertical shaft having three inlets at top, one for the mixture of solids, e.g., precalcined and prepulverized ore or slag and coke, also one each for chlorine (or other chlorinating gas) and for air or oxygen. Three outlets are also provided at the bottom: for molten iron, $TiO_2$ and $FeCl_4$.

The reactor for the operation, the simple vertical shaft furnace, is maintained at a temperature of about 600°C at the top, where chlorine gas and a mixture of prepulverized and precalcined solid reactants, ore or slag, coke, are fed. To supply additional heat by combustion of coke, air or oxygen may also be supplied. The temperature increases as all materials flow downwardly and is above the melting point of iron at the bottom. Here all products of the reactions — gaseous, liquid or solid — discharge.

Near the top of the shaft, the reduction-chlorination reactions of Equation 3 take place in the presence of the elemental chlorine; and the metallic iron which is so formed as a solid remains with the ore solids feed and the $TiO_2$ produced. Other chlorinating of minor metals take place and the solids have lost some of the impurities as S, P, Cr, and V, as well as some of the oxygen combined with iron; and thus have a higher $TiO_2$ content. A little farther down, at a higher temperature, the $TiCl_4$ formed by the reactions of Equation 3, reacts with an additional amount of FeO as shown by Equation 1. If the temperature is below its boiling point (1015°C), the $FeCl_2$ is a liquid; if above, it is a gas. In either case, the $FeCl_2$ descends with the $TiO_2$ also formed.

Still farther down, the reaction of Equation 2 takes place at a temperature higher than 1535°C, the melting point of the iron which is produced, while gaseous $TiCl_4$ and CO are formed to discharge, at least partially, through a bottom gas outlet. However, since the gaseous $TiCl_4$, although generally flowing downwardly, can circulate among the ore solids, some part of the $TiCl_4$ formed in the reaction of Equation 3 does indeed react with the FeO of adjacent ore, according to Equation 1. If the feed of gaseous chlorine is cut back somewhat, an even larger amount of the $TiCl_4$ will be so utilized, to minimize the possibility of discharge of any FeO in the bottom discharge. The molten iron is tapped as in a blast furnace. By control of temperature and of feeds of chlorine and the mixture of ore and coke, the relative amounts of the products of the reactions of Equations 1, 2, and 3 can be controlled so as to discharge, besides the molten iron, the titanium in either the form of $TiO_2$ or $TiCl_4$. The $Ti Cl_4$ is more readily produced in this system however.

The gas stream containing $TiCl_4$ which may be so discharged from the bottom of the shaft reactor may come as well as the $TiO_2$. If $TiCl_4$ is separated from this gas stream by partial condensation, as described above, it may be vaporized again and reintroduced into the top of the shaft furnace to take the place of a substantial part of the chlorine otherwise required there. Most, if not quite all, of the titanium in the original ore or slag may thus be separated as $TiO_2$ (rutile) at the bottom if all of the $TiCl_4$ is recycled. Again, some chlorine will be required, not for combining with the iron which goes off as the metal, but in minor amounts for forming HCl from water and hydrogen, also metallic chlorides from some other metals which are present as impurities.

Thus, the overall equation in the production of iron and $TiCl_4$ by the combined reactions of Equation 3, 1, and 2, may be summed and written

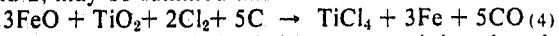

$$3FeO + TiO_2 + 2Cl_2 + 5C \rightarrow TiCl_4 + 3Fe + 5CO \quad (4)$$

(Obviously, if there is ferric iron present, it is reduced; and the reaction of Equation 1a may be combined with Equation 4 without material difference.)

The reaction of this overall Equation 4 gives very poor yields if the reaction is attempted at a single temperature rather than at a continually increasing temperature as described for the shaft furnace reactor described with concurrent gas and solid flow, wherein the yields may be very high.

If ilmenite is the charge stock, containing an equal number of atoms of titanium and iron, and using the stoichiometric amount of chlorine, Equation 4 shows that two-thirds of the equivalent $TiO_2$ of the ore may be discharged as such without ever having been through the chloridation and reoxidation processing. However, if the object is merely to remove the iron and to upgrade the $TiO_2$ content to above 95%, this is a simple and inexpensive method. On the other hand, the addition of sufficient chlorine to react with the 3 moles of $TiO_2$ which would be present with 3 moles of FeO in ilmenite allows the production of molten iron and $TiCl_4$.

Variations of the processes have been found to give optimum results with different conditions of operation, also as established for different equipment or compositions of the iron-titanium ore or slag. As one example of many, the reaction of Equation 1 may be accomplished under partial vacuum at a temperature considerably lower than 900°C to volatilize and purify the $FeCl_2$. After condensation, the $FeCl_2$ is vaporized under normal pressure to react in 2 according to Equation 2.

I claim:

1. A process conducted at approximately atmospheric pressure for making metallic iron in a dense phase from an original material in the form of particulate solids containing titanium oxide and iron oxide said process comprising the steps of:
    a. passing said original material into a first reaction zone wherein, at a temperature between about 950°C and 1100°C in the presence of a carbonaceous reductant, a titanium halide in an added gaseous stream halogenates in a first chemical reaction a substantial part of the iron in said iron oxide in said original material to produce an iron halide in said gas stream and additional titanium oxide;
    b. separating said gas stream containing said iron halide from the solid residue of said first chemical reaction, said solid residue containing both said titanium oxide in said original material and said additional titanium oxide produced in said first chemical reaction and having a greater ratio of atoms of titanium to atoms of iron than this ratio in said original material;
    c. passing said separated gas stream containing said iron halide into a second reaction zone maintained at a temperature between 1100°C and about 1800°C;
    d. passing at least a part of said solid residue containing said titanium dioxide into said second reaction zone;
    e. reacting in said second reaction zone in the presence of said carbonaceous reductant and by a second chemical reaction said iron halide in said gas stream and said titanium oxide in said residue, both said gas stream and said residue having come from said first reaction zone;
    f. producing in said second reaction zone by said second chemical reaction a dense phase of metallic iron, and said titanium halide in a gas stream containing a higher ratio of atoms of titanium to atoms of iron than in said original material; and
    g. separating said gas stream containing said titanium halide and passing at least a part of said titanium halide back to said first reaction zone to allow it to enter into said first chemical reaction.

2. The process according to claim 1 wherein the temperature in said second reaction zone is above 1535°C and said metallic iron is formed and removed in the liquid state.

3. The process according to claim 1 wherein at least a part of said solid residue produced by said first reaction and having a higher ratio of atoms of titanium to atoms of iron than in said original material is removed as a product.

4. The process according to claim 1 wherein at least a part of said titanium halide coming in a gas stream from said second chemical reaction is removed as a product, having a higher ratio of atoms of titanium to atoms of iron than in said original material.

5. The process according to claim 1 wherein said gas stream containing titanium halide formed in said second chemical reaction is separated from at least a part of the materials other than said titanium halide it contains before being utilized in said first chemical reaction.

6. The process according to claim 1 wherein said titanium halide is titanium tetrachloride, and said iron halide is, at least in part, ferrous chloride.

7. The process according to claim 6 wherein:
a. said ferrous chloride is produced in said first chemical reaction as a gaseous stream which is separated from said solid residue having a higher ratio of atoms of titanium to atoms of iron than in said original material;
b. said gaseous stream containing said ferrous chloride, and said solid residue containing said titanium oxide are passed to said second chemical reaction wherein said ferrous chloride and said titanium oxide in said solid residue are contacted in counter-current and reacted chemically with each other.

8. The process according to claim 7 wherein said gaseous stream separated from said solid residue from said first chemical reaction contains other gases in addition to said ferrous chloride; and at least some part of said other gases is removed from said stream; and said ferrous chloride in a more pure form than it left said first chemical reaction is passed to said second chemical reaction.

9. The process according to claim 6 wherein said first chemical reaction is accomplished during a first concurrent flow and contacting of a mixture of the particulate solids comprising said original material and said solid reductant, with a gas phase which contains a gas capable of chlorinating at least one of the constituents of said original material; and said second chemical reaction is accomplished at the higher temperature during a second concurrent flow of solids resulting from said first chemical reaction and the gas phase resulting from said first chemical reaction, which gas phase contains a gas capable of chlorination of at least one of the constituents of said original material.

10. The process according to claim 9 wherein said gas phase at the discharge of said concurrent contacting during which said second chemical reaction is accomplished contains titanium tetrachloride.

11. The process according to claim 10 wherein said discharging gas containing titanium tetrachloride has at least a part of the other materials also contained therein removed; and the remaining of said titanium tetrachloride is recycled, at least in part, to the beginning of said concurrent contacting wherein said first chemical reaction is accomplished.

12. The process according to claim 9 wherein said first concurrent contacting accomplishes sequentially said first chemical reaction, and said second concurrent flow accomplishes said second chemical reaction, while feeding said original material and gaseous chlorine into the top of a single reactor vessel having said first reaction zone above said second reaction zone and discharging titanium tetrachloride in a gas stream and molten iron from the bottom of said reactor vessel.

13. The process according to claim 11 wherein:
a. at least a part of said gaseous titanium tetrachloride, a reactant for said first chemical reaction, is produced by the preliminary reaction of gaseous chlorine with the titanium oxide in said original material in the presence of said carbonaceous reductant;
b. said products of said preliminary reaction continue said concurrent flow and concurrent contacting throughout the respective zones wherein said first chemical reaction takes place and said second chemical reaction takes place.

14. The process according to claim 6 wherein said first chemical reaction is accomplished in a counter-current contacting of the particulate solids of said original material and said solid reductant with said gaseous titanium tetrachloride.

15. The process according to claim 6 wherein said second chemical reaction is accomplished in a counter-current contacting of at least a part of said titanium oxide in said solid residue of said first chemical reaction with said ferrous chloride in gaseous form also produced by said first chemical reaction.

16. The process according to claim 1 wherein the solids resulting from said first chemical raction with said original material and then second chemical reaction starting with said residue of said first chemical reaction are heated to a final maximum temperature, above the melting point of iron, without an intermediary cooling and reheating.

17. The process according to claim 16 wherein at least some part of the heat required to bring the reactants of at least one of the two said chemical reactions up to its respective optimum temperature is supplied by the combustion of said carbonaceous reductant through the addition of an oxygen-containing gas to at least one of said reaction zones.

18. The process according to claim 4 wherein: said titanium halide is titanium tetrachloride; said iron halide is, at least in part, ferrous chloride; and chlorine gas is supplied to at least one of the two said chemical reactions in a total amount at least stoichiometrically equivalent to that in said titanium tetrachloride which is removed as a product.

19. The process according to claim 18 wherein said chlorine gas is supplied in amount sufficient to form chlorine compounds with at least some of the metals present as compounds in said original material other than compounds of titanium and iron.

20. The process according to claim 19 wherein at least some of said chlorine compounds of metals present as compounds in said original material other than compounds of titanium and iron are more volatile than ferrous chloride and are separated from the gaseous stream of ferrous chloride leaving said first chemical reaction.

21. The process according to claim 19 wherein at least some of said chlorine compounds of metals present as compounds in said original material other than compounds of titanium and iron are more volatile than ferrous chloride and are separated from the gaseous titanium tetrachloride formed in said second chemical reaction.

22. The process according to claim 19 wherein at least some of said chlorine compounds of metals present as compounds in said original material other than compounds of titanium and iron are less volatile than ferrous chloride and are separated from said solid residue of said first chemical reaction.

23. The process according to claim 6 wherein at least a part of said titanium oxide in said solid residue of said first chemical reaction is withdrawn after said first chemical reaction as a product containing a greater ratio of atoms of titanium to atoms of iron than this ratio in said original material.

24. The process according to claim 20 wherein at least some of said chlorine compounds of metals present as compounds in said original material other than compounds of titanium and iron are less volatile than ferrous chloride and are separated from said solid residue of said first chemical reaction; and at least a part of said gas stream leaving said second chemical reaction is removed as a product containing substantially pure titanium tetrachloride.

25. The process according to claim 6 wherein said original material is ilmenite.

26. The process according to claim 6 wherein said carbonaceous reductant present in said second chemical reaction was added to and was present during said first chemical reaction from which it was discharged in said solid residue passed to said second chemical reaction.

27. The process according to claim 6 wherein the several steps are conducted in batch processing.

28. The process according to claim 6 wherein said first chemical reaction and said second chemical reaction are conducted in continuous gas-solid countercurrent contacting reactors, at least one of which has from one to three equilibrium units of contacting efficiency.

* * * * *